(12) United States Patent
Løland et al.

(10) Patent No.: US 6,336,420 B1
(45) Date of Patent: Jan. 8, 2002

(54) CENTRAL HAULING POOL

(75) Inventors: Geir Løland, Stavanger; Birger Enerhaug, Ranheim, both of (NO)

(73) Assignees: Norsk Marinteknisk Forskningsinstitutt, Trondheim; Fiskerstrand Verft, Fiskarstrand, both of (NO)

(*) Notice: Subject to any disclaimer, the term of this patent is extended or adjusted under 35 U.S.C. 154(b) by 0 days.

(21) Appl. No.: 09/530,408
(22) PCT Filed: Oct. 26, 1998
(86) PCT No.: PCT/NO98/00319
  § 371 Date: Jul. 6, 2000
  § 102(e) Date: Jul. 6, 2000
(87) PCT Pub. No.: WO99/22984
  PCT Pub. Date: May 14, 1999

(30) Foreign Application Priority Data
  Oct. 30, 1997 (NO) .............................................. 975006

(51) Int. Cl.$^7$ .............................................. B63B 35/14
(52) U.S. Cl. ...................................................... 114/255
(58) Field of Search .............................. 114/255, 230.1, 114/230.12, 230.2, 293

(56) References Cited

U.S. PATENT DOCUMENTS

| | | | | |
|---|---|---|---|---|
| 3,057,104 A | * | 10/1962 | Constantopes | ............... 114/255 |
| 4,458,621 A | * | 7/1984 | De Clifford | ................ 114/255 |
| 5,676,083 A | * | 10/1997 | Korsgaard | ................... 114/293 |
| 5,842,424 A | * | 12/1998 | Lange et al. | ............ 114/230.12 |

* cited by examiner

*Primary Examiner*—Stephen Avila
(74) *Attorney, Agent, or Firm*—Young & Thompson

(57) ABSTRACT

The invention concerns a central hauling pool (1) e.g. for a fishing vessel, with the central hauling pool (1) constituting a generally vertical main tube (2) through the vessel, with a free lower opening or mouth (8) towards the sea and a free upper opening (4) towards the atmosphere. The novel and characterizing feature of the invention is that the upper part of the main tube (2) has a tube transition (5) constituting a large relative widening of the cross section area below the water line in the main tube (2) to an upper tube part (3). The effect of such a widening of the upper part of the central hauling pool is that the oscillations of the water surface is damped considerably as compared to the heave of the ship and the waves of the sea.

12 Claims, 4 Drawing Sheets

CENTRAL HAULING POOL

This invention concerns a central hauling pool, for instance arranged in a fishing vessel. The central hauling pool is used for setting out fishing tackle and hauling fishing tackle and catch. The central hauling pool may also be used for other equipment for use in the sea.

On fishing vessels, which in this example is chosen described as a vessel for long-line fishing, usually the long-line with the catch is hauled through hatches in the ship's side near the bow of the vessel, above the waterline. In some instances, the long-line is hauled over deck, but this entails vast disadvantages due to wind and weather. The vessel goes towards the long-line such that the line is hauled generally from the ahead direction, and such that the long-line comes in with a slightly rearwardly inclined angle between 10 and 20 degrees from the vertical line. Experience shows that this is the best way of hauling the line. A single hull vessel will always have a resonance period for its heave motion, and one will normally experience some heave motion in the vessel during normal operation. The most frequently occurring wind states off the Norwegian coast is wind forces between fresh breeze and near gale, with corresponding sea states. When the catch is hauled through hatches situated ahead on the ship's side, there is a risk for loosing parts of the catch by fish falling off the long-line as the fish is being hauled out of the sea. This may be due to several causes, e.g. that the buoyancy of the fish in the sea ceases to have effect and that the whole weight of the fish loads the hook, or that spray from vessel knocks the fish off the hook, or that the fish is knocked by seas independent of the vessel, or vessel heave, etc.

One possible solution to avoid the waves is to haul the long-line through a so-called "dragerbrönn"; a long-line hauling pool, an essentially tubular vertical aperture in the fishing vessel, with the main part of the tube open at its lower end towards the sea, and open in its upper en towards the free air or a room in the ship. Such a central hauling pool gives considerably improved working conditions for the man working at the rail roller who avoids standing exposed. The man working by the rail roller must be present by the central hauling pool to guide the fish in over the rail roller and into the crucifier (the device removing the fish from the hook) section of the vessel, and, not least, to gaff fish having fallen off the line. However, with a solution like this, one problem arises in that such a vertical tube will have a standing water column with a resonance period which may be corresponding with the vessels heave resonance period. Thus the water surface inside the central hauling pool will come to swing with large amplitudes as the fishing vessels heaves, or with the same period and amplitude as the waves at the sea, due to the pressure variations of the waves. It is also possible that the amplitude is amplified inside the central hauling pool. This may lead to loss of fish inside the central hauling pool in the same way as by ordinary fishing, and would also be a risk to the crew handling the long-line and the catch under deck. Wave damping devices may be arranged inside the central hauling pool. However these wave damping devices hinder the ordinary use of fishing tackle. Both fish and hooks may be hung up in them or braked, and the view is reduced due to foaming.

U.S. Pat. No. 4,176,614 describes one possible solution to change the resonance period of the central hauling pool by closing it against the free air. The American solution may be useful if one shall perform operations with wireline or drillstring through the central hauling pool, but it is not possible to haul fish through an air tight or almost air tight opening around a line. Further, the pressure variations in such an air tight chamber would be harmful to the crew (the man working at the rail roller). U.S. Pat. No. 4,176,614 describes that the central hauling pool may be pressurized or under pressurized in order to change the resonance period of the water column, partly in that the air chamber would act as an air spring with higher or lower pressure, partly in that the length of the water column would be changed to longer or shorter height.

U.S. Pat. No. 4,452,165 gives a solution by arranging or building in large tanks in semisubmersible platforms. The tanks shall have the waterline standing inside, with apertures to free air at the top and to free sea at the bottom, via canals with considerably smaller cross-section than the tanks.

One purpose with this invention is to extend the resonance period of the water column in the central hauling pool to become much longer than the resonance period of the vessel, and that it does not coincide with the periods of dominating sea wave amplitudes.

An other purpose with the invention is to reduce the wave amplitude in the central hauling pool both in consideration of the crew's working conditions, and to reduce the risk of loosing catch by tosses and local currents.

A third purpose with the invention is to transfer the hauling of the long-line-catch to a sheltered place inside the long-line-fishing vessel.

Mathematical modelling and scale model experiments have shown that the solution to the problems with fishing vessels as mentioned above, and which has been incompletely solved by the known art, is a central hauling pool in the fishing vessel, with the central hauling pool constituting an essentially vertical main tube through the fishing vessel, with a free lower opening or mouth towards the sea and a free upper opening towards the atmosphere. The new and characterizing trait by the invention is that the upper part has a tube transition comprising a large relative widening of the cross-section area under the waterline inside the main tube under the waterline, to an upper tube part, such as defined in claim 1.

Further traits by the invention will arise from the dependent claims, among others that the main tube may be elliptical, and from fishing considerations should be inclined slightly rearwards with respect to the vertical line, so that the lower mouth is situated astern of the upper mouth of the main tube.

Below, a short description of the drawings is given, with the invention illustrated and with reference numbers to the specification and the corresponding claims.

FIG. 1 displays a vertical section of a vessel with a central hauling pool according to the main idea of the invention.

Figure 1:
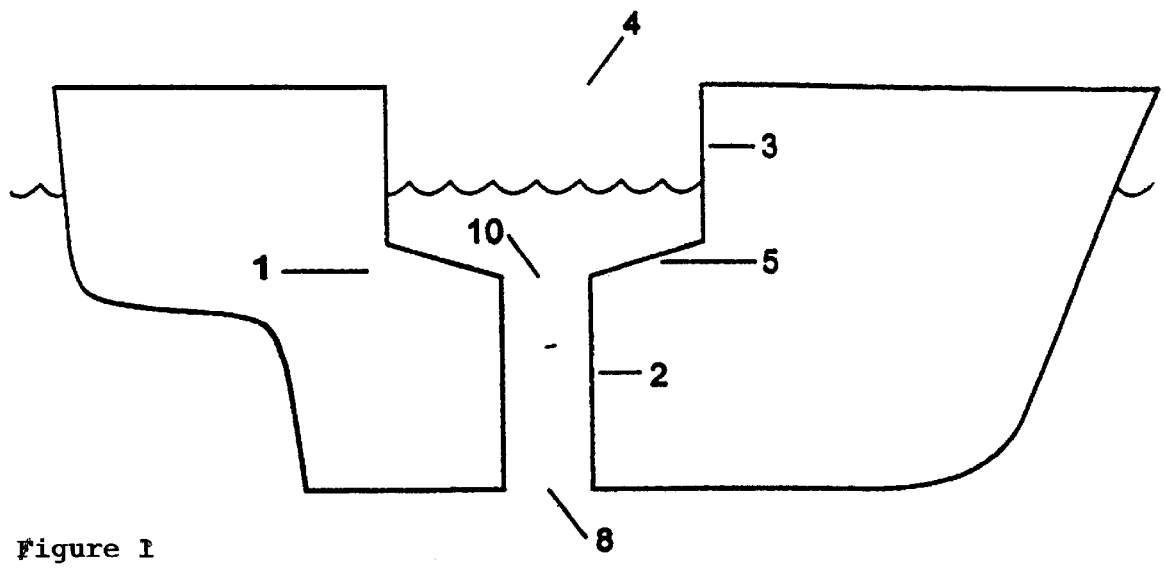

The central hauling pool 1 is in a preferred embodiment arranged somewhat astern of midship due to the heave (vertical) motion being least there. FIG. 1 shows the principle for the central hauling pool 1 itself with an essentially vertical main tube or duct 2. A tube transition 5 constitutes the connection between the main tube 2 and an widened upper tube part 3 of the central hauling pool 1. The tube transition 5 may be straight, horizontal or funnel-shaped.

Figure 2:
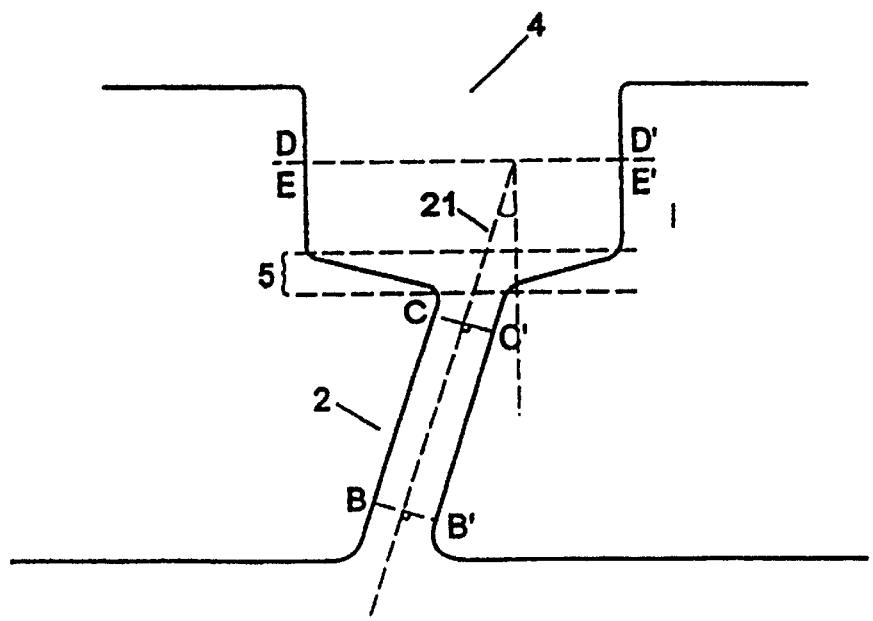
FIG. 2 shows a vertical longitudinal section through a part of the vessel's hull, a principally preferred embodiment of the invention.

FIG. 2 shows that the main axis 21 of the main tube 2 may be slightly inclined towards the stern, with a lower mouth 8 towards the sea arranged somewhat astern of the upper mouth 10. Experience shows that it is practical to go towards, but slightly over the line, so that the line is hauled from the astern direction with an angle deviating approximately 17 degrees from the vertical line. It is possible to control the speed and course of the vessel in order for the long-line to enter approximately in centre of the main tube 2.

Figure 2B:
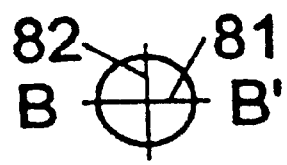
FIGS. 2b–2e show sections of the tube.
Figure 2C:
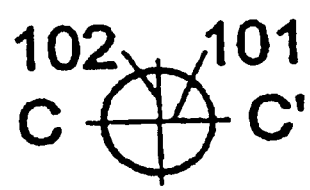

FIG. 2b and c shows cross-sections of the main tube 2 by the lower mouth 8 and the upper mouth 10, respectively. In a preferred embodiment of the invention the main tube 2 is elliptical with the long half-axis of the ellipse essentially along the vessel, and the length of the long half axis about 1 meter, and with the smaller half-axis length about 0,75 meter. Other ellipse shapes may be used, within the axis relations 1:1 (circular tube 2) and 3:1 (sideways flattened tube 2).

Figure 2D:
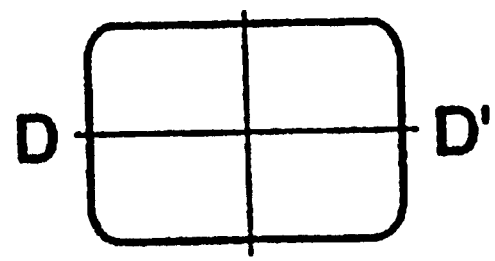
Figure 2E:
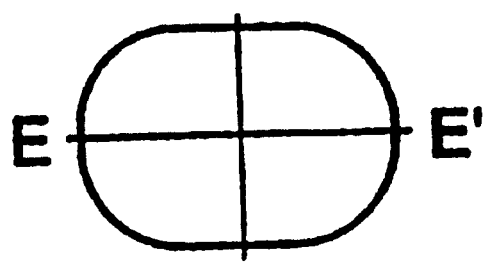

FIGS. 2d and e shows possible horizontal sections of the widened tube part 3.

Figure 3:
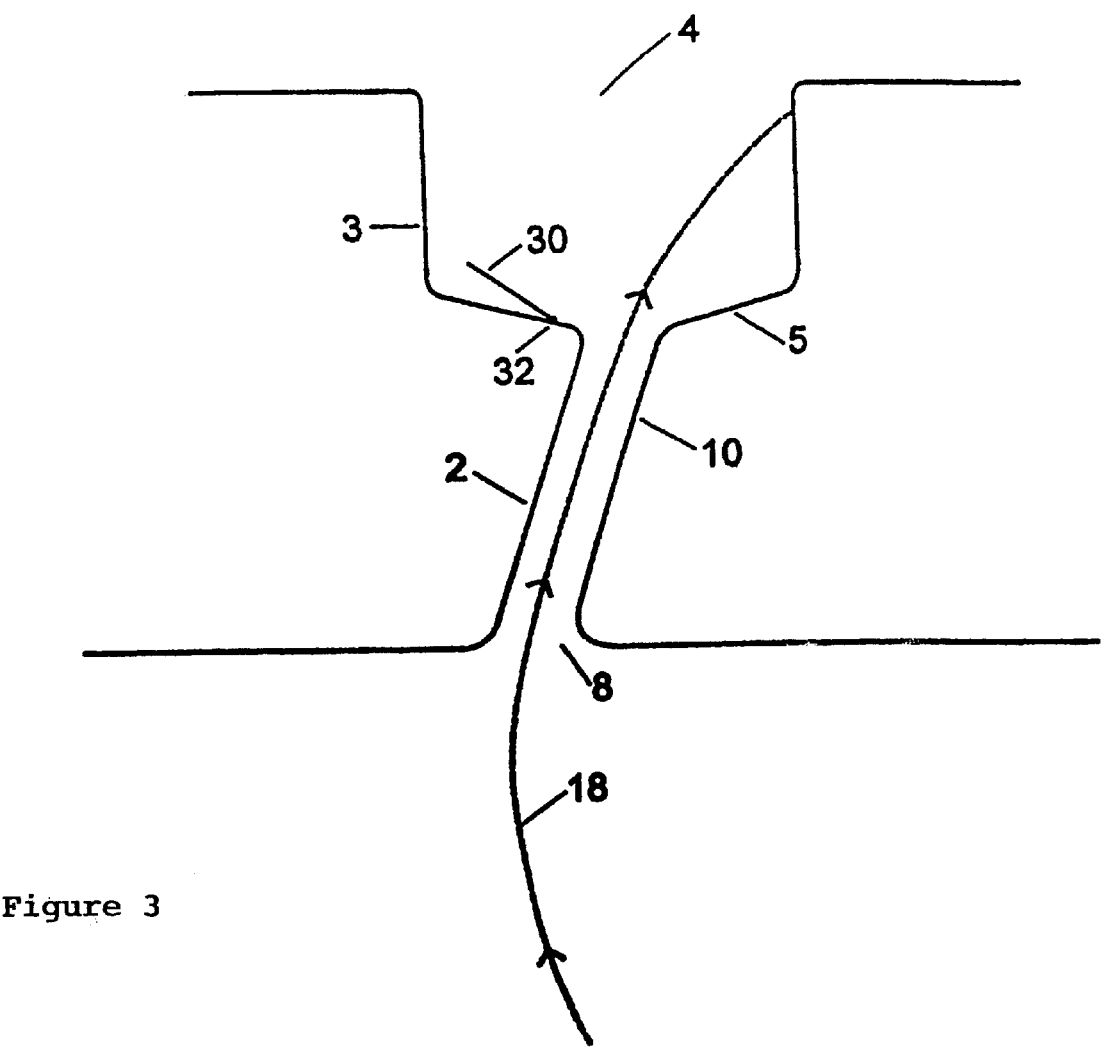
FIG. 3 shows a vertical section of the central hauling pool with a scuttle for adjustment of the upper cross-section and inclination angle of the bottom of the ream or expanding part of the central hauling pool.

FIG. 1 shows the tube transitions 5 with a funnel shape. In FIG. 3 a scuttle 30 is drawn, pivoted in a hinge 32 arranged near the upper mouth 10 of the main tube 2, reaching into the upper tube part 3. By rotation this plate away from that part of the bottom of the tube transition 5 where the hinge 32 is arranged, one change the effective area of the water surface of the upper tube party 3. Thus one may reduce the resonance period of the water column in the central hauling pool 1. This may be useful if the vessel should be exposed to large seas of the same long period as the resonance period of the central hauling pool according to the invention.

FIG. 3 also displays the preferred path for the long-line during the hauling of the catch. To keep the advantageous angle of 17 degrees with respect to the vertical, the main tube 2 has been given this angle with the vertical. Other angles may be more appropriate if it should show e.g. to be possible to increase the vessel's speed during hauling.

Figure 4:
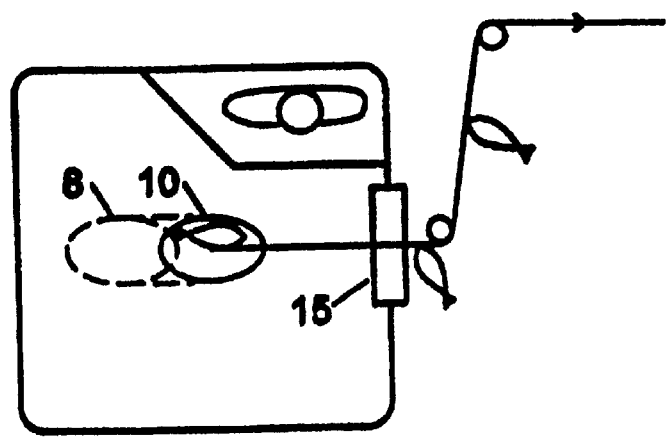
FIG. 4 shows a horizontal cross-section of the upper part of the central hauling pool and the location of the rail roller and the man working by the rail roller, with respect to the main tube of the central hauling pool.

FIG. 4 displays a horizontal cross-section of the upper part 3 of the central hauling pool 1, with a man working at the rail roller, situated on a shelf by the rail roller 15 where the long-line is to pass inside to the crucifier section.

Figure 5:
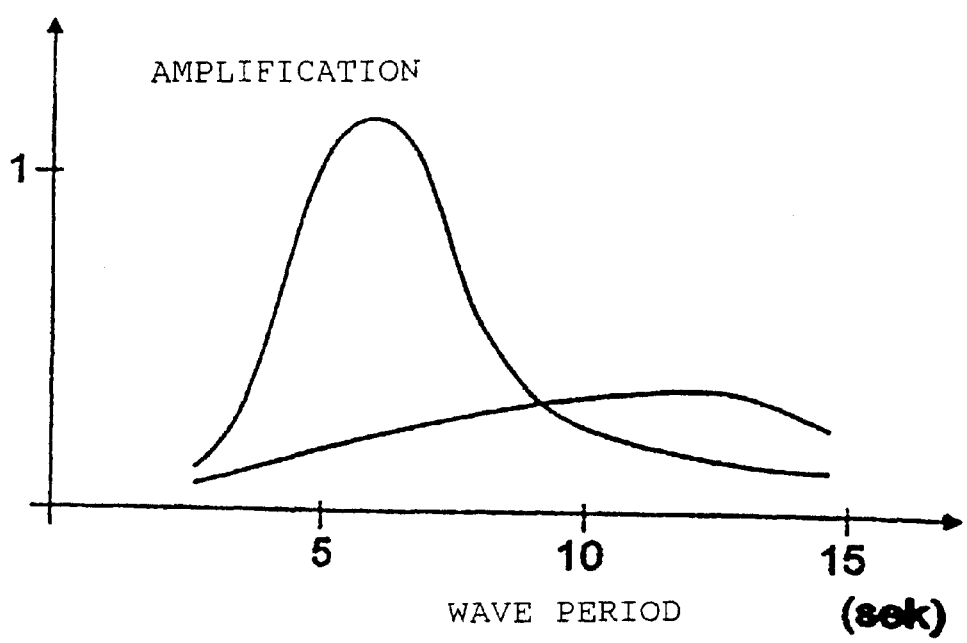
FIG. 5 shows, in a Cartesian coordinate system, the relation between the behaviour of the water surface and the wave height (level/wave height) with and without this invention.

FIG. 5 shows in a Cartesian coordinate system a generalized amplitude-wave spectrum for the waves inside a central hauling pool 1. The graphs show that a central hauling pool without an upper widened part may have a wave spectrum with large amplitudes with periods about 5–6 seconds, which may be the resonance frequency of the of the ship, or as for the waves outside the ship, but with the invention these amplitude tops are damped and displaced outwards towards longer wavelengths, out of the region of the vessel's resonance period.

The explanation of why the invention works may be several effects. Firstly the area of the water is expanded in the upper part of the central hauling pool, so that a large volume mus pass through the lower narrower part of the main tube in order to slightly displace the water surface of the upper expanded part. Secondly turbulence arises in the tube transition part 5. The turbulence may lead to dissipation of energy and finally to a weak heating of the water, practically undetectable. In addition the resonance period of the central hauling pool 1 will be extended considerably when it is widened in the upper part to a larger area below the waterline. Additional damping of the wave amplitude could have been achieved by closing the air column's upper part towards the atmosphere, but this is not recommended in consideration of the fishermen's health.

The invention is initially made for fishing vessels. It may be advantageous to use the invention in connection with hauling of fishing nets, thus with an other angle or direction of the axis of the main tube 2 with respect to the vertical line. However it would be possible to use the invention in connection with other marine operations, e.g. by oil drilling or oil production by means of single hulled vessels, where calm sea conditions in the central hauling pool would be advantageous. Examples of this may be oceanographic vessels with transducers arranged on a cable, seismic exploration vessels with seismic streamers which shall be launched and hauled, ordinary vessels which shall drop or lift their anchor, and generally every vessel that usually sets and hauls equipment from the sea whether the vessel is still-lying in the sea or running in the sea, and where there may be an advantage in having calm conditions in the sea space where the equipment is cuts the sea surface.

What is claimed is:

1. Central hauling pool for a seaborne vessel, said central hauling pool constituting a generally steeply inclined main tube through the vessel, said main tube having a main axis, said main tube having a free lower opening toward the sea and a free upper opening toward the atmosphere, in which an upper part of the main tube comprises a tube transition which constitutes a large relative widening of the cross-sectional area below the waterline in said main tube, to an upper tube part, and said main axis of said main tube deviates from the vertical, such that said lower opening is displaced aft toward the stern of the vessel and said upper opening is displaced toward the bow of the vessel.

2. Central hauling pool according to claim 1, in which said main axis deviates up to 30 degrees from the vertical.

3. Central hauling pool according to claim 1, in which said main axis deviates between 10 and 20 degrees from the vertical.

4. Central hauling pool according to claim 1, in which said main axis deviates between 17 and 18 degrees from the vertical.

5. Central hauling pool according to claim 1, in which said main tube has an elliptical cross-section normal to said main axis, with a relation between a semi-major axis and a semi-minor axis of said ellipse being between 1:1 and 3:1.

6. Central hauling pool according to claim 5, in which said lower mouth has an elliptical semi-major axis of a length approximately 1 meter and generally oriented along said main axis, and a semi-minor axis of a length approximately 0.75 meter.

7. Central hauling pool according to claim 5, in which said upper mouth has an upper semi-major axis of about 1 meter, generally along the direction of said main axis, and a semi-minor axis of about 0.75 meter.

8. Central hauling pool according to claim 1, in which said tube transition is funnel-shaped.

9. Central hauling pool according to claim 8, in which a plate or scuttle is arranged within said tube transition, said plate or scuttle being arranged to be pivotally turned in the upper widened part of said central hauling pool, about a hinge by said upper mouth.

10. Central hauling pool according to claim 1, in which said widening of cross-sectional area produces a resonance period for the water of said central hauling pool which is considerably longer than a resonance period for said vessel's vertical heave motion.

11. Central hauling pool according to claim 1, in which said upper widened part of said central hauling pool is generally elliptical in a horizontal cross-section.

12. Method for application of a central hauling pool of a vessel according to claim 1, comprising widening and adjusting the size of the free surface area of the upper part of the water column of said central hauling pool, in order for a resonance period of a water column of said central hauling pool neither to correspond with said vessel's resonance period nor to correspond with sea waves dominating amplitudes periods.

* * * * *